United States Patent
Haas et al.

(10) Patent No.: US 9,083,861 B2
(45) Date of Patent: Jul. 14, 2015

(54) VISUAL DATA COLLECTION SYSTEM FOR A TRAIN

(75) Inventors: Carl L. Haas, Walkersville, MD (US); John E. Halowell, Montgomery Village, MD (US)

(73) Assignee: Wabtec Holding Corp., Wilmerding, PA (US)

( * ) Notice: Subject to any disclaimer, the term of this patent is extended or adjusted under 35 U.S.C. 154(b) by 785 days.

(21) Appl. No.: 12/757,290

(22) Filed: Apr. 9, 2010

(65) Prior Publication Data

US 2011/0251742 A1    Oct. 13, 2011

(51) Int. Cl.
*G06F 17/40*     (2006.01)
*H04N 7/18*      (2006.01)
*B60R 11/04*     (2006.01)
*B61L 15/00*     (2006.01)

(52) U.S. Cl.
CPC ............ *H04N 7/183* (2013.01); *B61L 15/0054* (2013.01); *B60R 11/04* (2013.01); *B61L 15/009* (2013.01)

(58) Field of Classification Search
CPC ... B61L 15/00; B61L 15/009; B61L 15/0018; B61L 15/0027; B61L 15/0054; B60R 11/04
USPC .............................. 701/19, 301; 340/435–436, 340/426.22–426.23; 348/143, 148
See application file for complete search history.

(56) References Cited

U.S. PATENT DOCUMENTS

| | | | |
|---|---|---|---|
| 5,374,015 A * | 12/1994 | Bezos et al. | 246/169 R |
| 5,681,015 A * | 10/1997 | Kull | 246/187 C |
| 5,873,638 A | 2/1999 | Bezos | |
| 5,978,718 A | 11/1999 | Kull | |
| 6,128,558 A | 10/2000 | Kernwein | |
| 6,163,755 A * | 12/2000 | Peer et al. | 701/301 |
| 6,184,781 B1 * | 2/2001 | Ramakesavan | 340/435 |
| 6,227,625 B1 | 5/2001 | Gaughan | |
| 6,263,266 B1 | 7/2001 | Hawthorne | |
| 6,324,450 B1 | 11/2001 | Iwama | |
| 6,622,068 B2 | 9/2003 | Hawthorne | |
| 6,831,573 B2 | 12/2004 | Jones | |
| 7,243,026 B2 | 7/2007 | Kudo | |
| 7,317,987 B2 | 1/2008 | Nahla | |
| 7,446,650 B2 * | 11/2008 | Scholfield et al. | 340/438 |
| 2003/0222981 A1 * | 12/2003 | Kisak et al. | 348/148 |
| 2004/0073366 A1 * | 4/2004 | Jones | 701/301 |

(Continued)

FOREIGN PATENT DOCUMENTS

| | | | |
|---|---|---|---|
| JP | 769215 A | 3/1995 |
| KR | 20020096388 A | 12/2002 |

(Continued)

*Primary Examiner* — John Q Nguyen
*Assistant Examiner* — Michael Ng
(74) *Attorney, Agent, or Firm* — The Webb Law Firm

(57) ABSTRACT

An end-of-train unit for a rear railroad car, including: a housing mountable to a portion of the rear railroad car; a visual data collection device in operative engagement or at least partially integral with the housing and having a field-of-view, wherein the visual data collection device is configured to obtain visual data representative of at least a portion of the area in the field-of-view; and a transmission device in operative engagement or at least partially integral with at least one of the housing and the visual data collection device and configured to transmit the visual data to a processing unit of a forward railroad car. A visual data collection system and method are also provided.

23 Claims, 6 Drawing Sheets

(56) References Cited

U.S. PATENT DOCUMENTS

| | | | |
|---|---|---|---|
| 2005/0125113 A1 | 6/2005 | Wheeler et al. | |
| 2006/0151672 A1 | 7/2006 | Heddebaut et al. | |
| 2007/0112481 A1* | 5/2007 | Tsai et al. | 701/19 |
| 2007/0216771 A1* | 9/2007 | Kumar | 348/148 |
| 2008/0082237 A1 | 4/2008 | Breed | |
| 2014/0183303 A1* | 7/2014 | Kramer et al. | 246/167 R |

FOREIGN PATENT DOCUMENTS

| | | |
|---|---|---|
| KR | 1020040098489 A | 11/2004 |
| KR | 1020090129590 A | 12/2009 |

* cited by examiner

VISUAL DATA COLLECTION SYSTEM FOR A TRAIN

BACKGROUND OF THE INVENTION

1. Field of the Invention

The present invention relates generally to trains and train control systems, such as trains that include end-of-train (EOT) units and one or more processing units in a forward car or locomotive, and more particularly to an improved visual data collection system for use in connection with a train during operation thereof.

2. Description of the Prior Art

End-of-train (EOT) units coupled to the rear railroad car of a train are used extensively by railroads, and are configured to monitor air pressure in the air brake pipe, which runs the length of the train, as well as other parameters, such as motion. Mounted to the last railcar, the EOT unit is normally coupled to the brake pipe by means of a hose and a glad hand. The collected or sensed information and data is transmitted from the EOT to a head-of-train (HOT) unit, normally located in the locomotive (i.e., the forward railroad car). In addition, in some embodiments, the HOT unit can transmit an emergency brake application command to the BOT unit. Also sometimes referred to as a locomotive control unit (LCU), the HOT unit is mounted to or integrated with the train operator's console in the locomotive. Typically, a radio transmission device is used for communication between the HOT unit and the EOT unit. Further, an EOT unit typically includes a transmitter, a microprocessor, and transducer input ports for brake pressure, motion, and other inputs.

During train operation, the BUT unit transmits data to the HOT unit, normally via radio signals. As discussed, the EOT unit may include a pressure transducer to monitor brake pipe pressure, a motion sensor to sense movement of the railcar, a microprocessor unit to control the overall operation of these components, and a transmitter that the microprocessor unit uses to transmit the collected or sensed data. In the locomotive, and as discussed, the HOT unit may include a receiver to receive transmissions from the EOT unit, a primary display, and a microprocessor unit to direct the operation of these components. Using the data it receives from the EOT unit, the HOT unit thus continuously updates the train operator with the status of operations and/or conditions at the rear of the train. More notably, if a potentially dangerous situation arises, such as the brake pipe pressure plunges suddenly or drops below a predetermined level, the HOT unit operates to warn the train operator that an emergency condition exists at the rear of the train.

As discussed, the HOT unit has a primary display device (normally mounted to a display panel), which may include a dedicated display for each of several types of collected or sensed data transmitted from the EOT unit. For example, such data may include brake pipe pressure, low battery condition, whether the railcar is stopped or in motion, and whether an emergency has been enabled or disabled. In addition, the HOT unit may also have a supplemental message display, by which it visually conveys additional information, such as data related to arming of the EOT system, and whether or not the EOT and HOT units are communicating properly.

Appropriate data collection, transmission, and processing is essential for keeping the operator in the locomotive informed of all conditions and operation parameters associated with the train. Therefore, any additional data that can be collected and conveyed to the operator will lead to increased effectiveness in safe train operation. Various units and systems have been developed for use in connection with vehicular transit systems, such as railway systems, including U.S. Pat. Nos. 7,317,987 to Nahla; 7,243,026 to Kudo; 6,831,573 to Jones; 6,622,068 to Hawthorne; 6,324,450 to Iwama; 6,263,266 to Hawthorne; 6,184,781 to Ramakesavan; 6,163,755 to Peer et al; 6,128,558 to Kernwein; 5,978,718 to Kull; and U.S. Publication Nos.: 2008/0082237 to Breed; 2007/0112481 to Tsai et al.; 2006/0151672 to Heddebaut et al; 2005/0125113 to Wheeler et al; and 2004/0073366 to Jones.

However, there remains considerable room in the art for additional improvements and enhancements in data collection systems, arrangements, and the like for use in connection with transit systems and operations, such as railway transit systems.

SUMMARY OF THE INVENTION

Generally, the present invention provides a visual data collection system that overcomes or addresses some or all of the deficiencies and drawbacks associated with prior art systems. Preferably, and in some embodiments, the present invention provides a visual data collection system that collects data regarding the conditions at or around a rear railroad car of a train. Preferably, and in other embodiments, the present invention provides a visual data collection system that is integrated with or in operable communication with an end-of-train unit in a train control system. Preferably, in further embodiments, the present invention provides a visual data collection system that collects and transmits visual data regarding the rearward conditions of a train to a processing unit in a train control system.

Accordingly, in one preferred and non-limiting embodiment, the present invention provides an end-of-train unit for a rear railroad car. This end-of-train unit includes a housing mountable to a portion of the rear railroad car; and a visual data collection device in operative engagement or at least partially integral with the housing and having a rearward-facing field-of-view. The visual data collection device is configured to obtain visual data representative of at least a portion of the area in the field-of-view. A transmission device is in operative engagement or at least partially integral with the housing and/or the visual data collection device and configured to directly or indirectly transmit the visual data to a processing unit of a forward railroad car.

In a further preferred and non-limiting embodiment, the present invention provides a visual data collection system for a train, including an end-of-train unit having a housing configured to be coupled to a portion of a rear railroad car. The end-of-train unit includes: (i) a visual data collection device in operative engagement or at least partially integral with the housing and having a rearward-facing field-of-view, wherein the visual data collection device is configured to obtain visual data representative of at least a portion of the area in the field-of-view; and (ii) a transmission device in operative engagement or at least partially integral with the housing and/or the visual data collection device and configured to transmit the visual data. The system further includes a processing unit at a forward railroad car, including: (i) a receiving device configured to directly or indirectly receive the visual data transmitted from the transmission device; and (ii) a microprocessor configured to process the received visual data.

In a still further preferred and non-limiting embodiment, the present invention provides a method for telemetry of visual data in a train having a head-of-train unit at a forward railroad car and an end-of-train unit at rear railroad car. The method includes: obtaining visual data from a visual data collection device having a rearward-facing field-of-view, wherein the visual data is representative of at least a portion of the area in the field-of-view; and directly or indirectly transmitting the visual data to the processing unit of the forward railroad car.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
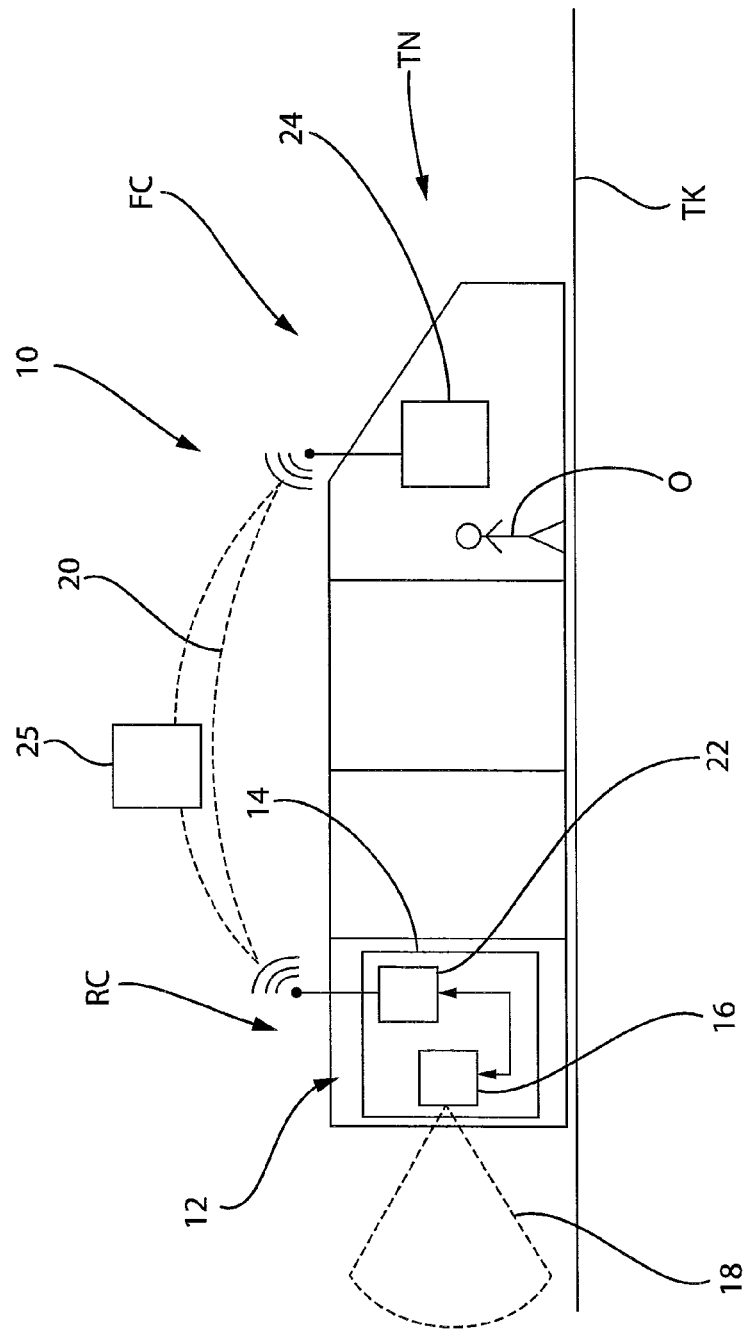
FIG. 1 is a schematic view of one embodiment of a visual data collection system according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

The present invention is directed to a visual data collection system 10, and an improved end-of-train unit 12, as illustrated in various preferred and non-limiting embodiments in FIGS. 1-6. In particular, and though not limiting, the visual data collection system 10 of the present invention can be used in connection with a train TR traversing a track TK. Further, the visual data collection system 10 of the present invention may include multiple interacting components positioned on the rear railroad car RC and/or forward railroad car FC, which is normally in the form of the locomotive.

In addition, the visual data collection system 10 of the present invention may include or be used in connection with an end-of-train unit, processing unit, head-of-train unit, on-board controller, or the like. Still further, parts of the visual data collection system 10 can be in operational communication with or otherwise integrated with an end-of-train unit, thereby providing an improved end-of-train unit 12. Still further, the presently-invented visual data collection system 10 can be used in connection with a variety of complex transit systems, and especially such systems that utilize extended vehicular arrangements.

As illustrated in one preferred and non-limiting embodiment in FIG. 1, a visual data collection system 10 is provided. This visual data collection system 10 includes an end-of-train unit 12 for use in connection with a rear railroad car RC. This end-of-train unit 12 includes a housing 14 that is mountable or otherwise attachable to a portion of the rear railroad car RC. In addition, a visual data collection device 16 is in operative engagement or at least partially integral with the housing 14, and this device 16 includes a field-of-view 18. This visual data collection device 16 obtains visual data 20 that is representative of at least a portion of the area in the field-of-view 18. While this field-of-view 18 is a generally rearward-facing field-of-view, it may also include a variety of directions and orientations in relation to the rear railroad car RC. For example, the field-of-view 18 may also be directed to capture visual data 20 at the sides of the rear railroad car RC, or even in a direction towards the front of the train, i.e., towards the forward railroad car FC.

The system 10 further includes a transmission device 22 that is in operative engagement or at least partially integral with the housing 14 and/or the visual data collection device 16. Once the visual data 20 is obtained, created, and/or processed by the visual data collection device 16, it is communicated to the transmission device 22, which transmits this visual data 20 directly or indirectly to a processing unit 24. As stated, this processing unit 24 is positioned on or located at the forward railroad car FC.

It should be noted that the processing unit 24 may take a variety of forms, and may be manufactured with, integrated with, or entirely comprise any controller, control device, or processing unit positioned on or in communication with the forward railroad car FC, such as the train engine or locomotive. For example, the processing unit 24 may be in the form of or be integrated with a head-of-train unit (as discussed above), or an on-board controller (OBC) (as is known in the art). Accordingly, multiple data processing and control functions could be centralized on a single processing unit located at the forward railroad car FC, and such a centralized processing unit could represent an originally-installed processing unit or a processing unit installed thereafter. All such forms and variations of a processing unit 24 are envisioned within the context of the present invention.

The visual data 20 may reach the processing unit 24 in a variety of communication paths, whether direct (point-to-point) or indirect. In particular, this visual data 20 may be transmitted from the transmission device 22 to the processing unit 24 via an indirect path including one or more remote units 25, as illustrated in FIG. 1. For example, this remote unit 25 may be in the form of a transmitter, a relay device, a central control unit, a remotely-located controller, a wireless device or relay, a network device, a computing device, or similar devices or equipment arrangements that permit for the receipt, processing, and/or relay of the visual data 20 to the processing unit 24. Additionally, this visual data 20 may be transmitted through or over a network environment (as supported by the necessary equipment and computing devices), such as the Internet or the like. Accordingly, any such direct or indirect communication techniques and methods are considered within the scope and context of the present invention.

This visual data 20 (which is representative of at least a portion of the rearward-facing field-of-view 18) can be transmitted by the transmission device 22 to the processing unit 24 in a variety of states. In particular, this visual data 20 may be transmitted in its raw form for processing at the processing unit 24. Alternatively, some or all of the processing may occur at the end-of-train unit 12, or some component thereof. Further, this visual data 20 may be video data, still-frame data, and/or other information or data used to construct a moving or static image that can be viewed. The visual data 20 is used to reconstruct an appropriate image at the forward railroad car FC for use by the operator O.

Figure 2:
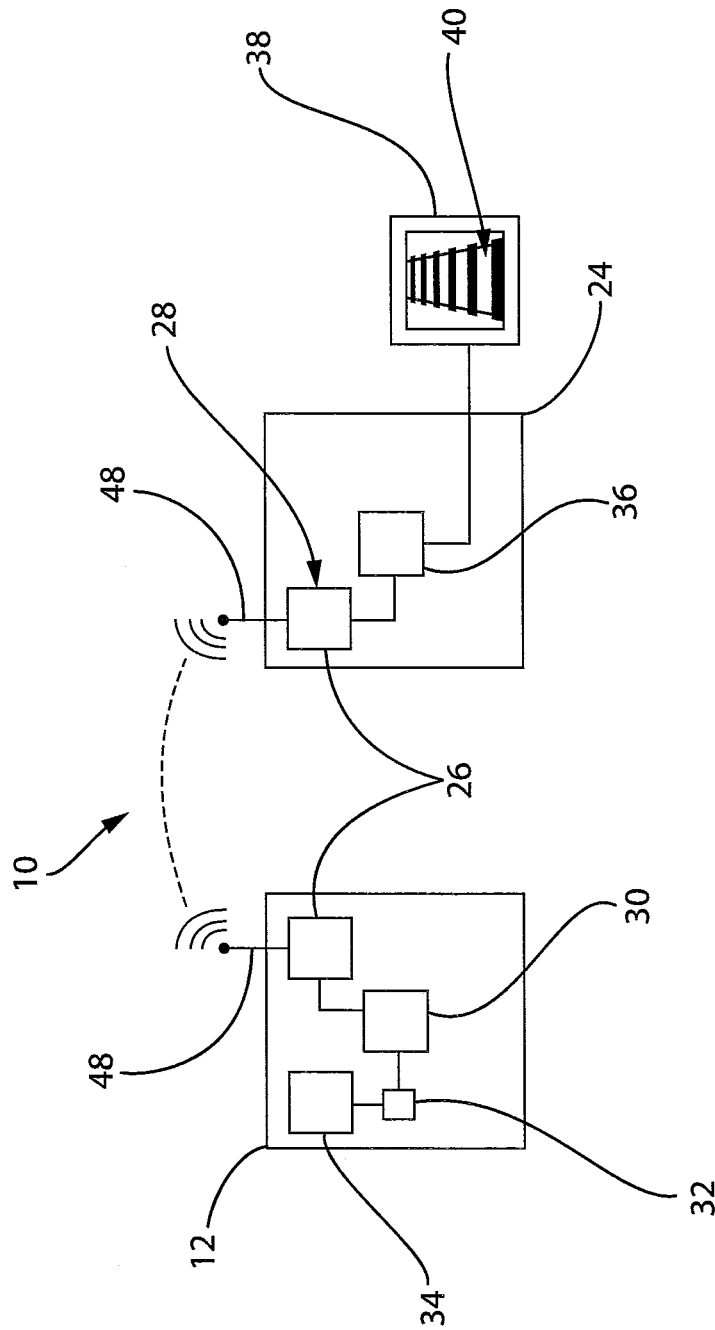
FIG. 2 is a schematic view of another embodiment of a visual data collection system according to the principles of the present invention.

In another preferred and non-limiting embodiment, and with reference to FIG. 2, the transmission device 22 may be in the form of a radio transceiver 26. This radio transceiver 26 is configured or operable to transmit the visual data 20 (whether in its raw, pre-processed, or fully-processed form) to a receiving device 28 in the processing unit 24. In particular, in this embodiment, this visual data 20 is transmitted in the form of radio waves, and the receiving device 28 is in the form of a radio transceiver 26.

The end-of-train unit 12 may also include a microprocessor 30, which controls the visual data collection device 16, the transmission device 22, and/or one or more of the electrically-controllable components of the end-of-train unit 12. Further, the microprocessor 30 may be in the form of any known computing or control device that can be programmed to communicate and process electrical signals and the like. Further, in this embodiment, the visual data collection device 16 is in communication with the microprocessor 30 through the use of a video interface device 32.

As discussed, the visual data collection device 16 includes an appropriate field-of-view 18 in order to collect the visual data 20. Accordingly, the visual data collection device 16 may take a variety of forms in order to accomplish this function. For example, the video data collection device 16 may be a video camera 34, a camera device, an intensified charge-couple device, a forward-looking infrared device, a thermal image device, a phase array radar-based device, or the like. Again, and regardless of the type of visual data collection device 16 used, the visual data 20 may be sent as raw data, pre-processed data, or fully-processed data to the processing unit 24.

It is further envisioned that the visual data collection device 16 can be movable, and thereby change the field-of-vision 18 in a configurable and user-specified manner. The control of the visual data collection device 16 could be through the microprocessor 30. Therefore, the visual data collection device 16 may be automatically controlled, remotely controlled, electronically controlled, microprocessor controlled, and/or manually-movable. This would allow the adjustment of the field-of-view 18 for the appropriate collection of visual data 20 that will be most helpful to the operator O in any given situation and environment. For example, in foggy conditions, it may be more beneficial to direct the field-of-view 18 to a location closer to the track TK, while in clear conditions, it may be more beneficial to move the field-of-view 18 to capture more distant visual data 20. In addition, the operator O may wish to view the side or front areas of the train TR.

As discussed above, the transmission device 22 and/or the receiving device 28 may be in the form of a radio transceiver 26. However, it is further envisioned that this transmission device 22 and/or receiving device 28 may be in the form of a high data rate modulation device, a Bluetooth-based device, an IEEE 802.11-based device, an ultra-high band-based device, a wireless device, a hard-wired device, a rail-based device, or the like. Any appropriate communication form and format can be used for transmitting the visual data 20 from the end-of-train unit 12 to the processing unit 24.

With continued reference to FIG. 2, the processing unit 24 may also include a microprocessor 36 for processing data, e.g., the visual data 20 obtained through the receiving device 28. As with the above-discussed microprocessor 30 of the end-of-train unit 12, the microprocessor 36 of the processing unit 24 may communicate with and/or control the receiving device 28 and/or some or all of the electrically-controlled components of the processing unit 24. Accordingly, the processing unit 24 may be in communication with or integrated with an existing head-of train unit or on-board controller in the forward railroad car FC.

In the illustrated embodiment of FIG. 2, the microprocessor 36 is in communication with a display device 38. While the display device 38 may be controlled by a different microprocessor or control device, in this embodiment, it is interfaced with the processing unit 24 and receives the visual data 20 received by the receiving device 28. This display device 38 is configured or operable to display an image 40 based at least in part upon the processed visual data 20. Of course, this image 40 can be augmented with existing visual data representations and information.

When using the above-discussed embodiment, wherein the visual data collection device 16 is movable, the appropriate components, e.g., a joystick, actuatable buttons, an interactive screen, etc., may be in communication with the microprocessor 36 in the processing unit 24. This allows the operator O to control movement of the visual data collection device 16 by using these controls, together with the communication link between the receiving device 28 (in the form of a radio transceiver 26) and the transmission device 22 (also in the form of a radio transceiver 26). Accordingly, the microprocessor 36 at the processing unit 24 may be configured to command and control any of the devices at the end-of-train unit 12, such as the visual data collection device 16.

Figure 3:
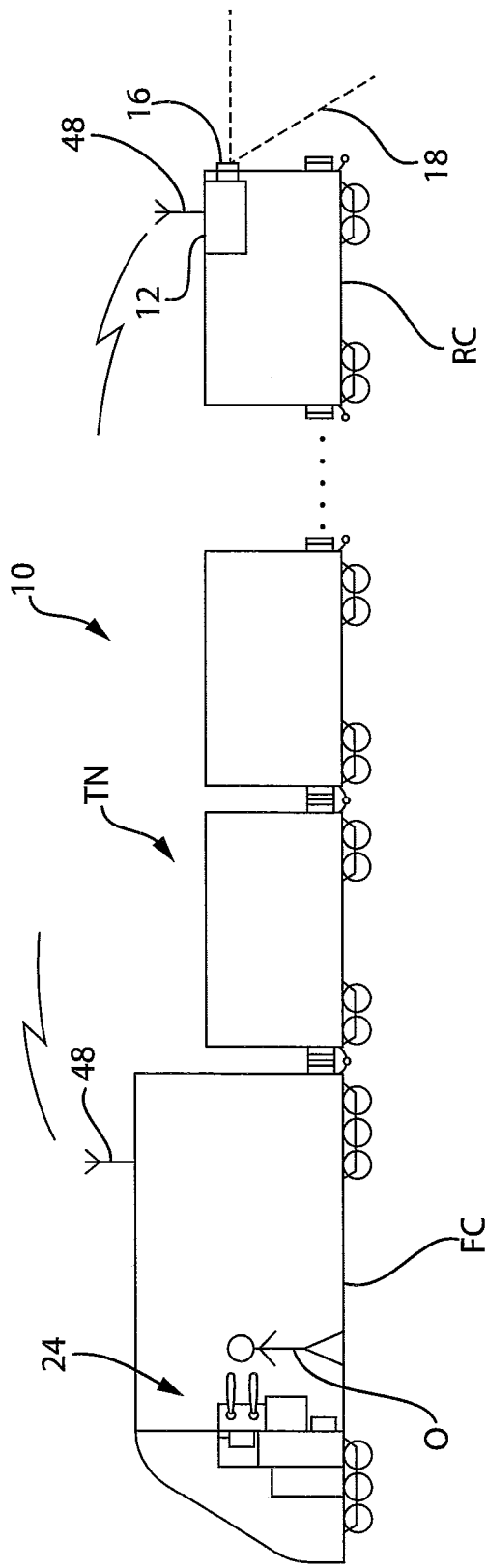
FIG. 3 is a schematic view of a further embodiment of a visual data collection system according to the principles of the present invention.

A further preferred and non-limiting embodiment of a visual data collection system 10 of the present invention is illustrated in FIG. 3. In this embodiment, the visual data collection system 10 is used in connection with a train TR having a forward railroad car FC and a rear railroad car RC. This embodiment demonstrates that the end-of-train unit 12 may take a variety of forms, and the visual data collection device 16 appropriately positioned (or movable) to maximize the desired field-of-view 18, and resulting collected visual data 20. In addition, as discussed, the processing unit 24 may be in the form of incorporated with, or integrated with a known head-of-train unit or on-board controller or other train control device or system.

Figure 4:
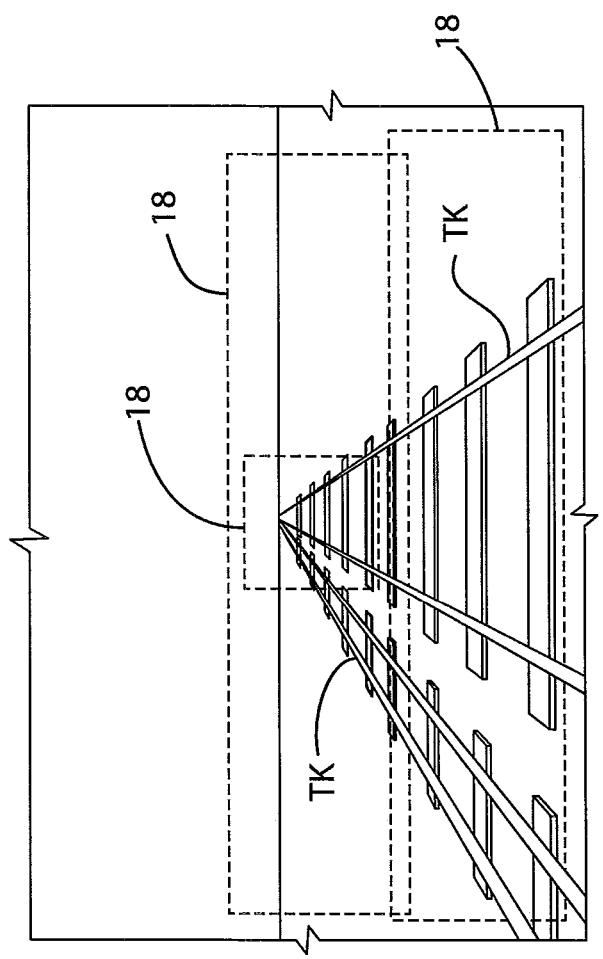
FIG. 4 is a schematic view of a field-of-view of a visual data collection system according to the principles of the present invention.

The preferred and non-limiting embodiment of FIG. 4 is provided to illustrate the configurability of the field-of-view 18, such as through using a movable field-of-view 18 (as implemented through a movable visual data collection device. Portions of FIG. 4 have been taken from and based upon FIG. 3 of U.S. Pat. No. 6,128,558 to Kemwein, the disclosure of which is incorporated herein by reference in its entirety.

As seen, this field-of-view 18 can be changed to capture different locations along the track TK or any of the areas of the train TR. In addition, it is envisioned that the operator O can control the extent, size, direction, orientation, etc. of the field-of-view 18, such as by using the controls provided in the forward railroad car FC (i.e., the locomotive). In addition, further functions can be provided to allow the operator O to zoom-in or zoom-out specified fields-of-view 18, view multiple sets or sub-sets of a field-of-view 18, or the like. In addition, such features and functions can be implemented at both the optical level, i.e., using the mechanics and lens arrangements of the visual data collection device 16, or alternatively, at the digital level, such as by using the microprocessor 30 and/or microprocessor 36. This provides the visual data collection system 10 of the present invention with the unique ability to create, maintain, and/or configure any desired field-of-view 18 with the resulting visual data 20 for transformation into and creation of the image 40.

Figure 5:
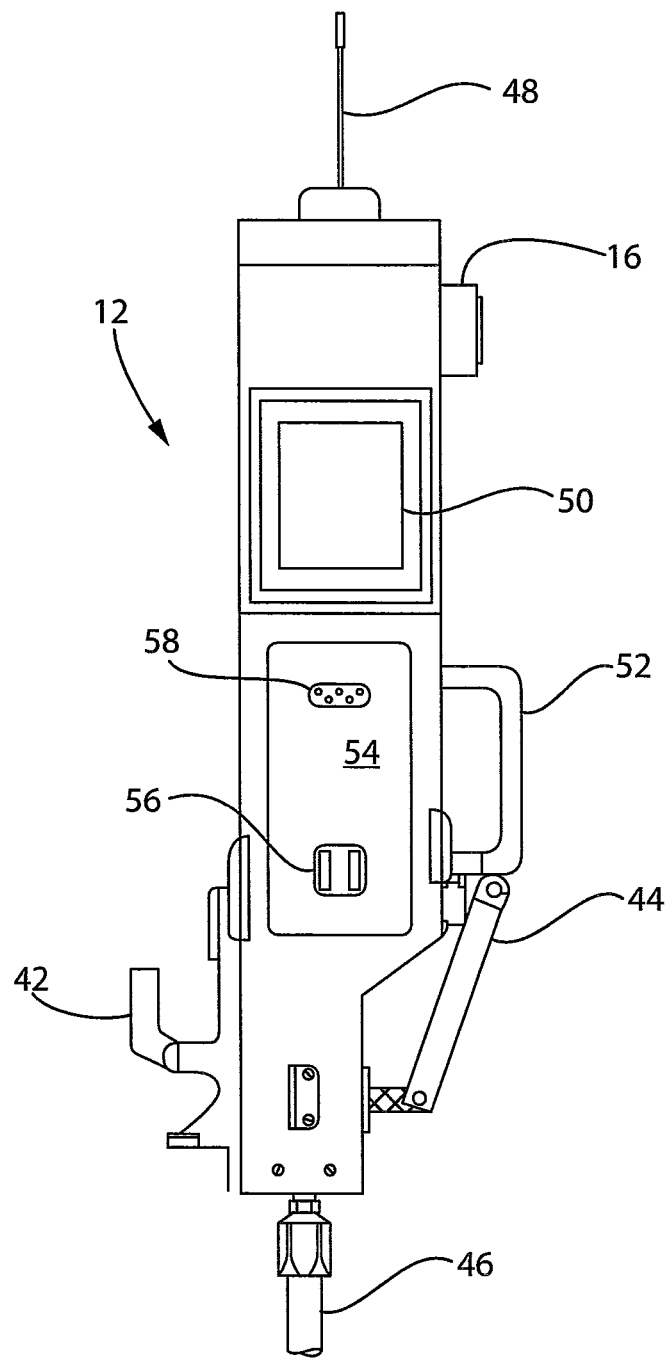
FIG. 5 is a side view of one embodiment of an end-of-train unit in a visual data collection system according to the principles of the present invention.

FIG. 5 illustrates a further preferred and non-limiting embodiment of an end-of-train unit 12 according to the present invention. Portions of FIG. 5 have been taken from and based upon FIG. 1 of U.S. Pat. No. 5,873,638 to Bezos, the disclosure of which is incorporated herein by reference in its entirety.

In this embodiment, the end-of-train unit 12 is configured to be mounted on the trailing coupler (not shown) of the rear railroad car RC, and is equipped with pressure monitoring and telemetry circuitry. The mounting occurs through the use of a coupler hook mount 42, which engages the trailing coupler of the train TR and is clamped in place through the use of a coupler mount tightening handle 44. A hose 46 is connected between the train TR brake pipe and the end-of-train unit 12, such that the air pressure of the brake pipe at the end of the train TR can be monitored.

As discussed above, the end-of-train unit 12 includes a microprocessor 30, and the end-of-train unit 12 communicates through the use of a radio transceiver 26 having an antenna 48 installed at the top of the end-of-train unit 12. Further, the end-of-train unit 12 may include a marker warning light 50 that flashes periodically and is monitored by the microprocessor 30. A carrying handle 52 is provided to allow railroad personnel to carry and mount the end-of-train unit 12.

As further illustrated in this embodiment, a battery compartment 54 houses a battery pack that plugs therein. In addition, two connectors in the back of the battery compartment are provided, including a power connector 56 to which the battery pack is connected when plugged into the battery compartment, and a standard RS232 serial connector 58, which is normally used only for testing purposes.

Figure 6:
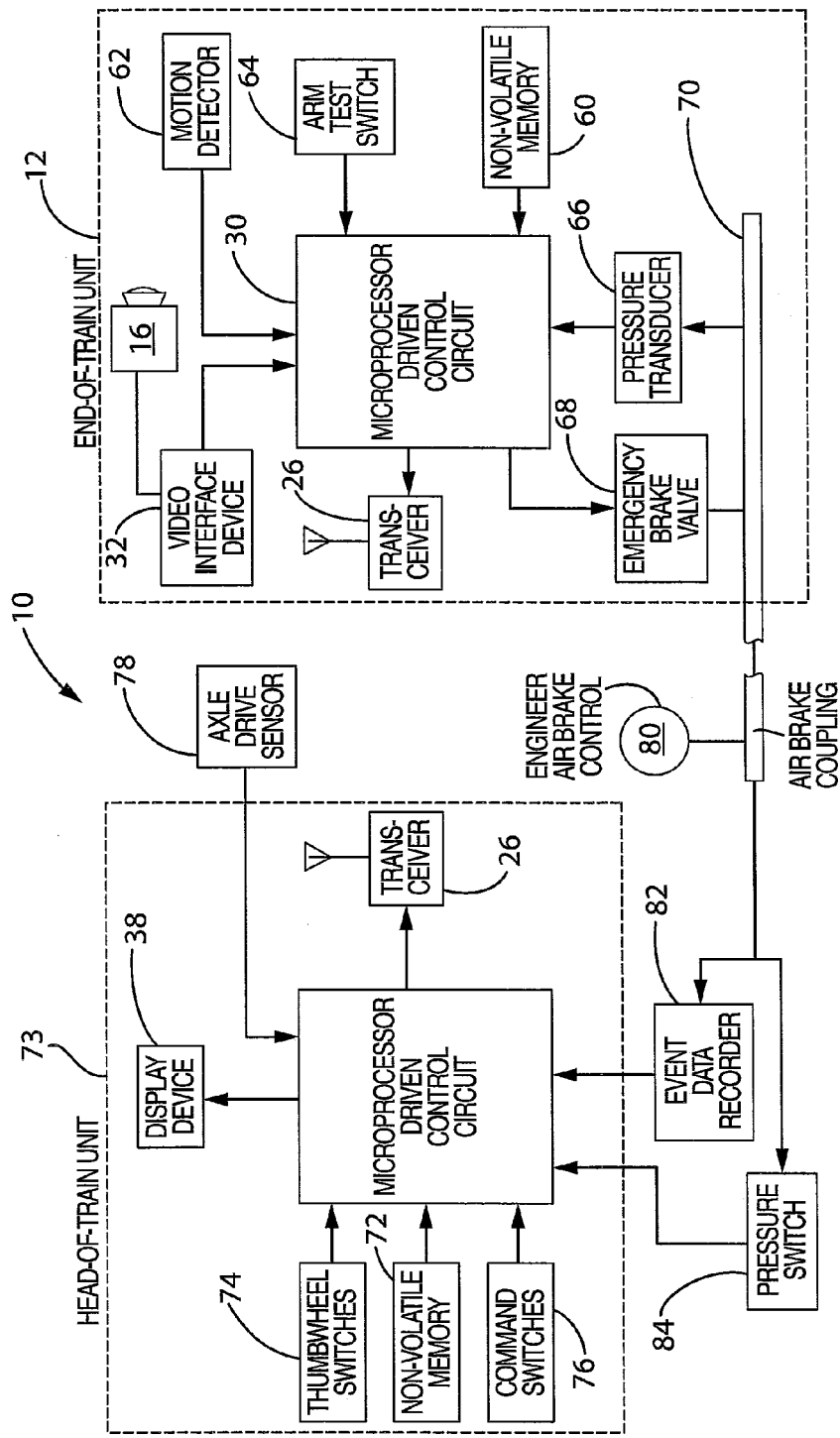
FIG. 6 is a schematic view of another embodiment of a visual data collection system according to the principles of the present invention.

A further preferred and non-limiting embodiment of the visual data collection system 10 is illustrated in FIG. 6. Portions of FIG. 6 have been taken from and based upon FIG. 1 of U.S. Pat. No. 5,374,015 to Bezos et al., the disclosure of which is incorporated herein by reference in its entirety.

In this embodiment, the end-of-train unit 12 includes the visual data collection device 16, which is controlled by the microprocessor 30 through a video interface device 32. In addition, the transmission device 22 is in the form of a radio transceiver 26, and is also controlled by the microprocessor 30. The microprocessor 30, which may be in the form of a microprocessor control circuit, includes a non-volatile memory 60 in which the control program for the microprocessor controller and the identifier code of the end-of-train unit 12 are stored. The microprocessor 30 also has inputs from a motion detector 62, a manually-activated arming and test switch 64, and a brake pressure responsive transducer 66, as well as an output to an emergency brake control unit 68 coupled to a brake pipe 70. As discussed above, the end-of-train unit 12 communicates with the receiving device 28 (in this embodiment, a radio transceiver 26) at the processing unit 24 by way of the radio transceiver 26 at the end-of-train unit 12.

Further, and in this embodiment, the processing unit 24 is in the form of or integrated with a head-of-train unit 73. This head-of-train unit 73 includes the above-discussed microprocessor 36 and display device 38. In addition, and as discussed in connection with the end-of-train unit 12, the microprocessor 36 of the head-of-train unit 73 is in communication with and/or controls various electrically-controllable components of the head-of-train unit 73. Accordingly, the microprocessor 36 includes a non-volatile memory 72 for storing the control program, and a series of thumbwheel switches 74 through which an operator stationed at the head-of-train unit 73 can operate the head-of-train unit 73. In addition to these inputs, the microprocessor 36 includes a command switch input 76 and other similar inputs. The various outputs from the microprocessor 36 can be visually or orally provided to the operator O on the display device 38. Further, the head-of-train unit 73 of this embodiment is connected to the locomotive's axle drive via an axle drive sensor 78, which provides a certain number of pulses per wheel revolution. Further, the operator O can control the air brakes of the train TR via the normal locomotive airbrake controls 80, which are in communication with the airbrake pipe 70.

In addition, and in this embodiment, the head-of-train unit 73 includes an event data recorder 82, which is coupled to the brake pipe 70 at the forward railroad car FC, i.e., the locomotive end of the train TR. An output of this event data recorder 82 is couple to the head-of-train unit microprocessor 36. In addition, a pressure switch 84 is also connected to the brake pipe 70 and provides an output directly to the microprocessor 36. This pressure switch 84 is used to sense and communicate with the processing unit 24 regarding the onset of an emergency brake application.

It should be noted that this visual data 20 can be sent dynamically as it is collected by the visual data collection device 16, or may also be sent in batches on a periodic basis, depending upon the need of a truly "dynamic" display or image 40. Therefore, and as discussed, this visual data 20 can be sent in its raw form, a pre-processed form, or a fully-processed form for use in generating the image 40 on the display device 38. Any communication techniques and platforms are envisioned for use in collecting, generating, processing, and/or communicating the visual data 20 between the end-of-train unit 12 and the processing unit 24.

In this manner, the present invention provides a visual data collection system 10 and end-of-train unit 12 that collects and transmits the visual data 20. This visual data 20 can be used by an operator O in the safe operation of the train TR. The nature of this visual data 20 can be such that the operator O can make appropriate and immediate control decisions regarding operation of the train TR. Accordingly, the present invention provides a configurable and useful "rearview mirror" to the train operator O.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An end-of-train unit mountable to a rear railroad car for sensing brake pressure, comprising:
   a housing mountable to a portion of the rear railroad car;
   a visual data collection device at least partially integral with the housing and having a field-of-view, wherein the visual data collection device is configured to obtain visual data representative of at least a portion of the area in the field-of-view;
   at least one pressure transducer within or supported by the housing, the at least one pressure transducer configured to monitor a brake pressure;
   at least one processor within or supported by the housing, the at least one processor in communication with the visual data collection device and the at least one pressure transducer; and
   at least one transmission device in communication with the at least one processor and at least partially integral with at least one of the housing and the visual data collection device, wherein the at least one transmission device is configured to transmit the visual data and the brake pressure directly or indirectly to a processing unit of a forward railroad car.

2. The end-of-train unit of claim 1, further comprising a coupler hook mount member attached to the housing and configured for attachment to a portion of the rear railroad car.

3. The end-of-train unit of claim 2, further comprising a coupler mount tightening handle configured to clamp the housing to the portion of the rear railroad car.

4. The end-of-train unit of claim 1, wherein the at least one processor is further configured to control at least one of the following: the visual data collection device, the at least one transmission device, at least one electrically-controllable component of the end-of-train unit, or any combination thereof.

5. The end-of-train unit of claim 4, wherein the visual data collection device is in communication with the at least one processor via a video interface device.

6. The end-of-train unit of claim 1, wherein the visual data collection device is moveable to thereby change the field-of-vision.

7. The end-of-train unit of claim 6, wherein the visual data collection device is at least one of the following: automatically controlled, remotely controlled, electronically controlled, microprocessor controlled, manually-moveable, or any combination thereof.

8. The end-of-train unit of claim 1, wherein the transmission device is a radio transceiver configured to transmit the visual data in the form of radio waves to a radio transceiver in the processing unit.

9. The end-of-train unit of claim 1, wherein the visual data collection device is at least one of the following: a video camera, a camera device, an intensified charge-couple device, a forward-looking infrared device, a thermal image device, a phase array radar-based device, or any combination thereof.

10. The end-of-train unit of claim 1, wherein the at least one transmission device is at least one of the following: a high data rate modulation device, a Bluetooth-based device, an IEEE 802.11-based device, an ultra-high band-based device, a wireless device, a hard-wired device, a rail-based device, or any combination thereof.

11. A visual data collection system for a train, comprising:
   an end-of-train unit having a housing configured to be coupled to a portion of a rear railroad car, the end-of-train unit comprising: (i) a visual data collection device at least partially integral with the housing and having a field-of-view, wherein the visual data collection device is configured to obtain visual data representative of at least a portion of the area in the field-of-view; and (ii) a transmission device at least partially integral with at least one of the housing and the visual data collection device and configured to transmit the visual data; and
   a head-of-train unit at a forward railroad car, comprising: (i) a receiving device configured to directly or indirectly receive the visual data transmitted from the transmission device; and (ii) a microprocessor configured to process the received visual data.

12. The system of claim 11, further comprising a microprocessor in the end-of-train unit configured to control at least one of the following: the visual data collection device, the transmission device, at least one electrically-controllable component of the end-of-train unit, or any combination thereof.

13. The system of claim 12, wherein the visual data collection device is in communication with the microprocessor via a video interface device.

14. The system of claim 11, further comprising at least one display device in the forward railroad car and in communication with the microprocessor of the processing unit, wherein the display device is configured to display an image based at least in part upon the processed visual data.

15. The system of claim 11, wherein the visual data collection device is moveable to thereby change the field-of-vision, and wherein the microprocessor of the processing unit is further configured to control the movement of the visual data collection device.

16. The system of claim 11, wherein the transmission device is a radio transceiver configured to transmit the visual data in the form of radio waves, and the receiving device is a radio transceiver configured to receive the radio waves.

17. The system of claim 11, wherein the visual data collection device is at least one of the following: a video camera, a camera device, an intensified charge-couple device, a forward-looking infrared device, a thermal image device, a phase array radar-based device, or any combination thereof.

18. The system of claim 11, wherein the transmission device is at least one of the following: a high data rate modulation device, a Bluetooth-based device, an IEEE 802.11-based device, an ultra-high band-based device, a wireless device, a hard-wired device, a rail-based device, or any combination thereof.

19. The system of claim 11, wherein the visual data collection device is moveable to thereby change the field-of-vision.

20. The system of claim 11, wherein the visual data collection device is at least one of the following: automatically controlled, remotely controlled, electronically controlled, microprocessor controlled, manually-moveable, or any combination thereof.

21. The system of claim 11, wherein the processing unit is in the form of or integrated with a head-of-train unit in the forward railroad car.

22. A method for telemetry of visual data in a train having a processing unit at a forward railroad car and an end-of-train unit at rear railroad car, the method comprising:
   providing the end-of-train unit at an end of the rear railroad car, the end-of-train unit comprising a housing, the housing including at least one processor and a visual data collection device protruding from or partially integrated with the housing, the visual data collection device having a field of view;
   obtaining visual data from the visual data collection device, wherein the visual data is representative of at least a portion of an area in the field-of-view; and directly or indirectly transmitting the visual data to the processing unit of the forward railroad car.

23. The method of claim 22, further comprising displaying an image at least partially based upon the visual data on a display device located in the forward railroad car.

* * * * *